(12) United States Patent
Riederer

(10) Patent No.: US 8,390,675 B1
(45) Date of Patent: Mar. 5, 2013

(54) STEREOSCOPIC CAMERA AND SYSTEM

(76) Inventor: Thomas Paul Riederer, Santa Barbara, CA (US)

( * ) Notice: Subject to any disclaimer, the term of this patent is extended or adjusted under 35 U.S.C. 154(b) by 1526 days.

(21) Appl. No.: 11/881,617

(22) Filed: Jul. 24, 2007

Related U.S. Application Data

(63) Continuation-in-part of application No. 11/256,497, filed on Oct. 21, 2005.

(60) Provisional application No. 60/833,117, filed on Jul. 24, 2006.

(51) Int. Cl.
*H04N 13/02* (2006.01)

(52) U.S. Cl. .......................... 348/47; 348/158

(58) Field of Classification Search .................. 348/36, 348/47, 48, 158, 159
See application file for complete search history.

(56) References Cited

U.S. PATENT DOCUMENTS

| | | | |
|---|---|---|---|
| 4,418,993 A | 12/1983 | Lipton | 352/57 |
| 4,583,117 A | 4/1986 | Lipton et al. | 358/92 |
| 4,631,580 A * | 12/1986 | Taube et al. | 348/47 |
| 4,879,596 A | 11/1989 | Miura et al. | 358/88 |
| 4,881,122 A | 11/1989 | Murakami | 358/88 |
| 5,164,827 A | 11/1992 | Paff | 358/108 |
| 5,438,386 A | 8/1995 | Chao | 354/402 |
| 5,510,832 A * | 4/1996 | Garcia | 348/56 |
| 5,726,704 A * | 3/1998 | Uomori | 348/47 |
| 6,005,607 A * | 12/1999 | Uomori et al. | 348/42 |
| 6,157,337 A | 12/2000 | Sato | 341/155 |
| 6,512,892 B1 | 1/2003 | Montgomery et al. | 396/326 |
| 6,549,650 B1 * | 4/2003 | Ishikawa et al. | 382/154 |
| 2001/0033327 A1 * | 10/2001 | Uomori et al. | 348/47 |
| 2003/0128892 A1 | 7/2003 | Avinash | |
| 2010/0177168 A1 * | 7/2010 | Hu | 348/47 |

OTHER PUBLICATIONS

Riederer et al.; Stereoscopic Image Acquisition Device; U.S. Appl. No. 11/256,497, filed Oct. 21, 2005.
Riederer, "Stereoscopic Camera and System"; U.S. Appl. No. 60/833,117, filed Jul. 24, 2006.
Riederer; "Stereoscopic Electronic Microscope Workstation"; U.S. Appl. No. 60/762,577, filed Jan. 29, 2007.

\* cited by examiner

*Primary Examiner* — Patrice Winder
(74) *Attorney, Agent, or Firm* — Schmeiser, Olsen & Watts LLP

(57) ABSTRACT

The present invention provides a stereoscopic camera containing a binocular instrument and an integrated Stereoscopic Image Acquisition Device (SIAD), and improved methods for acquiring stereoscopic image data. The invention also provides master-slave control of adjustable channels in a stereoscopic camera. The camera can be free standing and may contain integrated power supplies, image processing units, storage mechanisms, or display mechanisms. The invention circumvents the need for, and limitations of, binocular eyepieces, and is capable of producing high resolution, real-time image data while avoiding or mitigating the deleterious effects of spurious parallax, IPD, and convergence.

18 Claims, 2 Drawing Sheets

STEREOSCOPIC CAMERA AND SYSTEM

CROSS-REFERENCE TO RELATED APPLICATIONS

This application is a continuation-in-part of U.S. patent application Ser. No. 11/256,497 filed on Oct. 21, 2005 and claims the benefit of U.S. Provisional Patent Application No. 60/833,117 filed on Jul. 24, 2006, the entire disclosures of which are incorporated herein by reference.

BACKGROUND OF THE INVENTION

1. Field of the Invention

This invention generally relates to methods for stereoscopic imaging and, more specifically, to a device that acquires stereoscopic images.

2. Description of Related Art

The use of stereoscopy, in which the user sees left- and right-eye views and forms a three dimensional image through stereopsis, is common in many areas of science, medicine and entertainment. The use of a binocular to provide a magnified stereoscopic image of distant objects to a user's eyes is also common. Binoculars are used for observation, surveillance, and many other purposes.

The optical image generated by a binocular is typically viewed through eyepieces. However, the use of eyepieces in binocular systems is often problematic. Furthermore, only one observer at a time can view images generated by the binocular and the observer can no longer see what is happening in the surrounding environment. In addition, a binocular, as such, cannot store images or sequences of images for later playback, process them in special ways, or transmit them to remote viewing sites. There are also situations in which it is desirable to remotely view or record a stereoscopic image of a location without involving a person to take the image.

Therefore, it is often desirable to use electronic imaging to acquire images of a location, either for direct, real-time observing or for recording Electronic imaging is a preferred method of the television broadcasting, video and movie industries as well. The use of cameras and electronic displays to acquire images is well known in the art, including the use of two cameras and a 3D display to give a stereoscopic image.

However the two-camera systems have many disadvantages. Obtaining and maintaining stereoscopic alignment (necessary for comfortable, long-term viewing) can be very difficult when two independent cameras are mounted on or comprise a binocular. The cameras generally protrude from the general body of the device and are often mounted in a way that is fragile and prone to breakage. Protruding cameras can interfere with other apparatuses in the workspace, limiting possible usage configurations. The two-camera systems have generally double the binocular and camera knobs and controls, resulting in an unwieldy device difficult to operate by a single user. Dual camera systems generally require numerous mounting parts, resulting in less reliability and more cost than a single, integrated camera.

There are also problems with mounting and connecting the cameras to displays or storage media. The use of two cameras requires multiple cables and connectors, resulting in less reliability and more difficult installation than a single cable/connector arrangement of the present invention. The two-camera system also typically requires two camera control units (CCUs) and two storage devices, and requires that they be synchronized for best image quality. This significantly increases the cost of the system.

In addition, such cameras do not allow precise positioning of the imaging sensors to each other for best stereopsis and comfortable viewing, particularly when two off-the-shelf cameras are used. Cameras which are wide cannot be easily positioned side-by-side with close spacing. The cameras must be individually focused after mounting, and, should adjustments such as brightness and contrast be needed, each camera must be controlled individually. Where the cameras contain irises, they must also be individually adjusted for each camera, resulting in the potential for unequal amounts of light entering each camera, which can lead to difficult 3D viewing and eyestrain. All these factors indicate that using such a system requires skill and can be very time-consuming.

Image processing is also problematic in such systems. The cameras must be electronically linked in some way so that the two image streams are synchronized, creating additional cost and complexity. Even if the data streams are synchronized, generally the shutters are not perfectly synchronized such that the nth pixel from one view was not captured at the same time as the nth pixel from the other view, causing moving objects to show spurious parallax when displayed. Furthermore, the images acquired by the two cameras are generally taken directly to the 3D display device. Therefore, should the user require image processing, storage, transmission, or display on alternative displays, additional processing units are required, creating additional cost and complexity.

The cameras used in such two-camera systems also usually conform to the NTSC or PAL video standard, both of which suffer from low resolution, poor color fidelity, and motion artifacts (due to the interlaced nature of the raster scan). Recording and editing recorded content is also problematic with the two-camera system. Recorders don't generally start and end synchronously, so the two tapes or files must somehow be synchronized, resulting in additional effort and expense. Editing may need to be performed twice—once to each file or tape.

Information relevant to attempts to address these problems can be found in U.S. Pat. Nos. 4,418,993; 4,583,117; 4,879,596; 4,881,122; 5,164,827; 5,438,386; 6,157,337, and 6,512,892.

However, each one of these references suffers from one or more of the following disadvantages: the device or system creates two independent output signals; is not compact; does not provide sufficient image processing, recording, or transmission capability; does not have adequate resolution in real-time for many applications; is cumbersome or is not easily operated by a single user; is large and expensive; more than one operator is generally needed to properly control all of the required functions in order to provide good images,; it is difficult to synchronize two separate cameras to the pixel level; two recording devices or image-capturing paths are required, resulting in additional complexity and cost in acquiring and recording the images and editing them as is often desirable; accessory image/data recording systems have a required start-up time prior to recording; uses significant power, requiring large batteries for mobile applications and emitting significant heat that could disturb sensitive environments; is more fragile than a single camera; or does not perform well if either or both of the cameras uses automatic focusing, automatic exposure control or image stabilization control, because such systems or devices heretofore have not been synchronized for the two views from the two cameras;

Therefore, the use of binocular systems containing electronic cameras, recording devices and display therefore solves some of the eyepiece problems but creates new ones, essentially making them impractical for routine use.

SUMMARY OF THE INVENTION

The present invention provides improved devices and methods for viewing and recording images and, in particular, stereoscopic binocular images.

The invention relates to a compact stereoscopic camera capable of providing visual observation and recording of images of a location. In particular, the present invention provides a binocular instrument having an integrated Stereoscopic Image Acquisition Device (SIAD) which circumvents the need for, and limitations of binocular eyepieces. The camera acquires and transfers high-resolution, real-time stereoscopic image data in a single data stream, from stereoscopic still or moving views of a location synchronized to the pixel level, to image processing, recording, or display systems which may be included in an integrated handheld device. The device performs the desired functions without protruding elements, numerous cables and connectors, and other additional components, and could be readily operated by a single user.

One aspect of the invention is a stereoscopic camera having a binocular instrument and a stereoscopic image acquisition device. In one embodiment, the camera contains mechanisms or structures designed to avoid spurious parallax. In another embodiment, the camera contains mechanisms or structures designed to control the effect of varying IPD. In yet another embodiment, the camera contains mechanisms or structures designed to control the effects of varying convergence. In a further embodiment, the camera can provide a non-reflected view or desirable orientation of the location. In another embodiment, the camera contains master-slave control of adjustable channels. In yet another embodiment, the camera may be free standing and contains an integrated power source, image processing unit, and storage device. In yet another embodiment, a display mechanism is integrated into the camera.

A second aspect of the invention is a stereoscopic camera including master-slave control of adjustable camera channels such that aspects of the views from channels are equalized, providing optimal stereopsis.

A third aspect of the invention is a method for acquiring stereoscopic images of a location, the method including steps for interactively aligning vergence without producing substantially abrupt transitions in the views used to acquire the stereoscopic images. In one embodiment, alignment could be achieved by a single user. In another embodiment, alignment could be achieved simultaneously with other camera adjustments. In yet another embodiment, the method includes processes for maintaining vertical position equalization in order to prevent spurious parallax between the respective views.

A fourth aspect of the invention is a stereoscopic camera in which the functional elements of a binocular instrument and a stereoscopic image acquisition device are integrated into a single package.

A fifth aspect of the invention is an interactive method for mitigating the effects of camera shake while acquiring stereoscopic images.

These and other further features and advantages of the invention will be apparent to those skilled in the art from the following detailed description, taken together with the attached drawings.

DETAILED DESCRIPTION OF THE INVENTION

Figure 1:
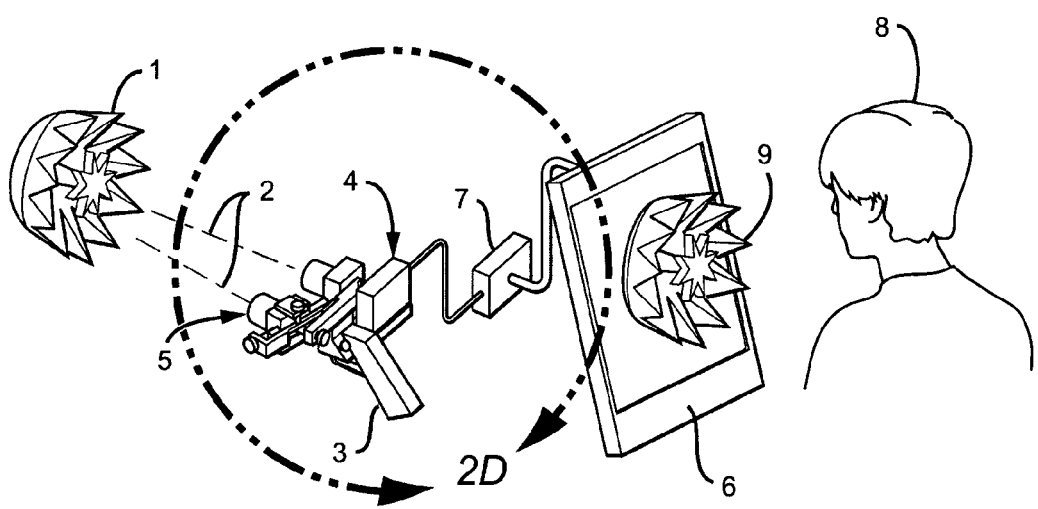
FIG. 1 is a perspective view of one embodiment of the invention having a stereoscopic camera system, including the system components and a viewer.

The present invention provides improved devices and methods for viewing and recording images and, in particular, binocular stereoscopic images.

Briefly, and in general terms, the present invention is directed to an optical instrument having an integrated SIAD device. In particular, the present invention provides a binocular having an integrated SIAD device which circumvents the need for, and limitations of, binocular eyepieces, and additionally includes numerous features not hitherto associated with binoculars.

In particular, the present invention relates to a compact stereoscopic camera capable of providing visual observation of a location. In particular, the present invention provides a binocular instrument having an integrated Stereoscopic Image Acquisition Device (SIAD) which circumvents the need for, and limitations of, binocular eyepieces. The camera acquires and transfers high-resolution, real-time stereoscopic image data in a single data stream, from stereoscopic still or moving views of a location synchronized to the pixel level, to image processing, recording, or display systems which may be included in an integrated handheld device. The device performs the desired functions without protruding elements, numerous cables and connectors, and other additional components, and could be readily operated by a single user.

The following description presents preferred embodiments of the invention representing the best mode contemplated for practicing the invention. This description is not to be taken in a limiting sense but is made merely for the purpose of describing the general principles of the invention whose scope is defined by the appended claims.

Before addressing details of embodiments described below, some terms are defined or clarified. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Furthermore, any definitions used refer to the particular embodiments described herein and are not to be taken as limiting; the invention includes equivalents for other undescribed embodiments. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

As used herein, the term "beam" is intended to mean a rigid member or structure supported at one or both ends, subject to bending forces from a direction perpendicular to its length. A beam can be made flexible in a direction and rigid in others.

As used herein, the term "binocular" is intended to mean an optical instrument consisting of two optical paths, each comprising one or more optical components, such as a lens, or combination thereof for focusing a stereoscopic image of a location or object therein on, for example, the eyes of a viewer or on a sensor. A binocular can be used for magnifying a small distant object but can also be used to provide a de-magnified view of a location, for example a wide-angle stereoscopic image of a landscape location. By comparison, a microscope generally is used for magnification of small objects which are close and held attached to a stationary portion of the microscope to which the optical path is focused. A binocular is generally used to observe objects at more varying, farther and random distances.

As used herein, the term "camera" is intended to mean a device that consists of one or more lightproof chambers with one or more apertures fitted with one or more in combination lens or other optical component through which the image of an object is projected and focused onto a surface for recording (as on film, for example) or for translation into electrical impulses or data, for display or recording (as for television broadcast, for example).

As used herein, the term "camera shake" is intended to mean the effect of unintended vibration and random motion imparted to a camera by the unsteadiness of the holding device, which is generally a user's hands, a vehicle's mounting bracket or an unsteady base. Camera shake appears on a display as a bouncing or vibrating view.

As used herein, the term "centration" is intended to mean the accuracy with which the optical axis of a lens in an optical instrument coincides with the mechanical axis of a mounting in the instrument for that lens. Poor centration can cause spurious parallax when optical components are moved relative to one another or to a sensor.

As used herein the term "channel" when referring to a stereoscopic camera is intended to mean the components required to acquire a view of a stereoscopic image. One nonlimiting example of a channel consists of a lens, optical path and one or more sensors to acquire the view as data. Channels are typically arranged such that the optical axes are coplanar and may converge at a distant point, and the input optical components are generally side by side.

As used herein the term "channel spacing" or "spacing of channels" refers to the distance between the optical paths at the inputs to the input optical components of channels, often objective lenses. Channel spacing may be adjusted in order to change one or more of the views of a location, thereby providing a desired perspective of the stereoscopic image formed by the views.

As used herein, the term "controller" is intended to mean the component of a system that contains the circuitry necessary to interpret and execute instructions fed into the system. For example an acquisition system may contain an acquisition controller. Representative graphics controllers include without limitation a graphics card, video card, video board, video display board, display adapter, video adapter, graphics adapter, image processing unit or combination thereof.

As used herein, the term "de-reflection" refers to reversing the reflecting effect of a deflecting element. If a mirror or other deflecting element is used between the object and a camera, for example to look around a corner, the view can be reversed electronically by reassigning the location of pixels within the views such that the view presented on the display is oriented as if the object was viewed directly.

As used herein, the term "electronic mechanisms for adjusting the size of an object" include automatic zoom and digital zoom.

As used herein, the term "equalize" or "equalized" is intended to mean to cause to correspond, or be like, in amount or degree as compared, including without limitation to make equal or to compensate for differences.

As used herein, the term "equalization of size" refers to having an object appear at the appropriate size to each eye of the viewer. Generally for objects in front of a viewer an object will appear the same size in each eye. As such, in a stereoscopic image it is important that an object appear the same size in each view in order for the viewer to form the best stereopsis. If the object does not appear to be the same size, the size can be equalized by making the size of one view equal to that of the other view of the object to correct the image.

As used herein, the term "equalization of vertical position", vertical referring to the direction perpendicular to the plane of the optical axes of two channels of a stereoscopic camera, refers to making an object appear at the appropriate vertical position to each eye of the viewer. Generally a point on an object is at the same vertical position in each view to avoid spurious parallax which detriments the viewer's stereopsis. If the object does not appear to be at the same vertical position, the position can be equalized by making the position of one view equal to that of the other view of the object to correct the image.

As used herein, the term "free-standing" is intended to describe a device which is sufficiently complete in construction such that no additional devices are required for its operation. For example without limitation, a camcorder can be free-standing as it runs on batteries and has a built-in recording system; the user need have no other device to operate it.

As used herein, the term "high-resolution" when referring to stereoscopic images is intended to mean at least about 1280 by 720 pixels for each left or right view. It is contemplated that resolutions of three times and eight times this minimum resolution may be implemented depending on the state of technology for sensors and displays and depending on what cost is acceptable. On the other hand, the devices of the present invention may be implemented without limitation with higher or lower resolutions for either one or both of the views.

As used herein, the term "image data" is intended to mean data produced by regular array detectors such as CMOS, CCDs and infrared devices. The data structures are created by the data acquisition systems or acquisition controller for use by observers, data reduction systems, and archives.

As used herein the term "kinematic relationship" is intended to mean the ability to deduce the motion of points on a device from the knowledge of the motion of other points on the device and the geometry of the device. For example without limitation, if one end of a long lever is lifted, say, 2 inches, it can be deduced from the kinematic relationship that the motion of the midpoint of the lever is about 1 inch.

As used herein, the term "lens" is intended to refer to a piece of transparent material (such as, for example, glass) that has two opposite regular surfaces, either both curved or one curved and the other plane, and that is used either singly or combined in an optical instrument for forming an image by focusing rays of light. "Lens" may refer to an individual lens or a plurality of individual lenses acting in combination.

As used herein, the term "location" is intended to mean a position or site marked by some distinguishing feature, including without limitation a place, scene, or point therein.

As used herein, the term "magnification" is intended to mean the ratio of the size of an image to the size of an object. It can be a relative term because an electronic image of an object imaged with a camera could be displayed on a large or a small display device and hence have different magnifications resulting from identical image data.

As used herein, the term "mechanism" is intended to mean a process, technique, device or system for achieving a result. A mechanism may be controlled in a variety of ways, including without limitation mechanically, electromechanically, electrically, or electronically operated mechanisms.

As used herein, the term "optical" is intended to mean of or relating to or involving light or optics, including without limitation the use of visible radiation or combinations of visible and non-visible radiation to visualize objects.

As used herein, the term "optical component" is intended to mean a part of an optical system which deflects, refracts, restricts, focuses, manipulates, mirrors, modifies, filters or has some other intended effect on a beam of light including without limitation lenses, prisms, mirrors, and beamsplitters.

As used herein, the term "optical instrument" is intended to mean any optical instrument capable of generating images including without limitation microscopes, endoscopes, binoculars, and telescopes.

As used herein, the term "optical path" is intended to mean the generally central ray in an optical system. Should the system have no central ray then the optical path is the general centerline of the average of all the rays.

As used herein, the term "optical device" is intended to mean any device or instrument capable of generating, sensing, capturing, processing, formatting, or storing images or image data.

As used herein, the term "optical instrument" is intended to mean any optical instrument capable of generating visible stereoscopic images including without limitation microscopes, endoscopes, binoculars, and telescopes.

As used herein, the phrase "real time" is intended to mean that the image data is acquired, processed, transmitted, or displayed at a sufficiently high data rate and at a sufficiently low delay that objects on a display move smoothly, for example without user-noticeable judder or latency between object motion and display motion. Typically, this occurs when new images are acquired, processed, and transmitted at a rate of at least about 24 frames per second (fps) and displayed at a rate of at least about 45 fps and when the combined processing of the system has no more than about $\frac{1}{30}^{th}$ sec of delay.

As used herein, the phrase "single data stream" is intended to mean a combination of more than one individual data streams into a single stream such that a desirable aspect of the data is maintained, such as timing or scale.

As used herein, the term "sensor" is intended to mean a device that responds to a stimulus, such as heat, light, or pressure, and generates one or more signals that can be measured or interpreted.

As used herein, the term "shutter" is intended to mean a camera component that allows light to enter by opening and closing an aperture.

As used herein, the term "spurious parallax" is intended to mean the parallax between views in a stereoscopic image which appears imperfect to the viewer. Vertical parallax of even a small amount results in poor stereopsis. For example, spurious parallax can be caused by non-planar optical axes of channels, unequal magnification in channels, vibration of the camera, distorted or unequal optical paths of channels and similar imperfections.

As used herein, the term "stereoscopic image" is intended to mean a single image consisting of at least two views, one corresponding to a left-eye view, i.e. the left view, and one corresponding to a right-eye view, the right view.

As used herein, the term "stereoscopic image acquisition device" is intended to mean a device capable of acquiring stereoscopic images from an optical instrument, such as binoculars or the imaging components thereof. The device acquires and transfers high-resolution, real-time image data from stereoscopic still or moving images to image processing, recording, or display systems. The device performs the desired functions without protruding elements, numerous cables and connectors, and other additional components such as eyepieces, and can be readily adapted for use with a variety of optical instruments.

As used herein, the term "telescope" is intended to mean an instrument designed for the observation of remote objects, typically comprising an input optical component at the distal end of a tube and one or more optical components at the proximal end, such tube providing a path for light beams and possibly a path to change the spacing of optical components and hence focus or magnification, including without limitation a tubular optical instrument for viewing distant objects by means of the refraction of light rays through a lens or the reflection of light rays by a concave mirror.

As used herein, the term "vergence" is intended to mean the ability of the optical axes of the eyes or of an optical instrument to rotate toward or away from each other to remain pointed at an object as it approaches or moves away.

As used herein, the term "view" is intended to mean extent or range of vision.

Attention is now directed to more specific details of embodiments that illustrate but not limit the invention.

General Description

One embodiment of the invention provides a stereoscopic camera that includes a Stereoscopic Image Acquisition Device (SIAD) having an acquisition controller and a binocular optical instrument that may be attached to or built into the SIAD.

Figure 2:
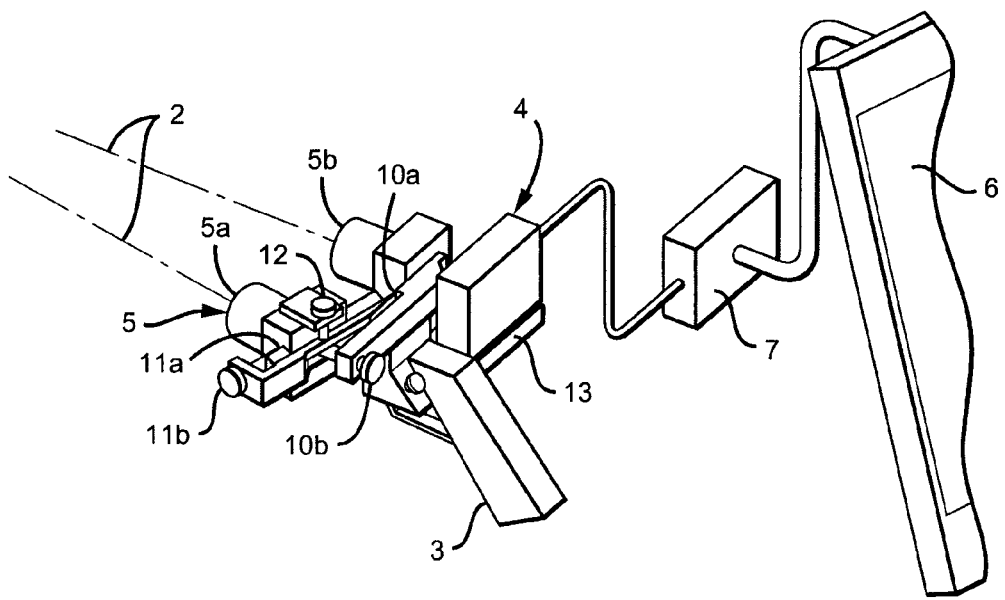
FIG. 2 is an expanded perspective view of the stereoscopic camera components of the embodiment shown in FIG. 1.
Figure 3:
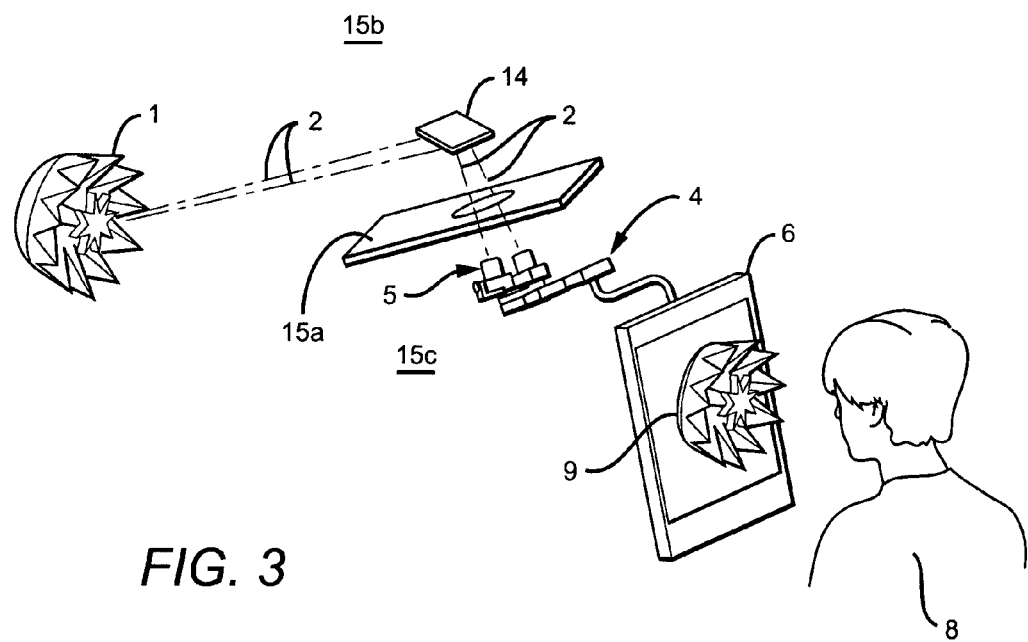
FIG. 3 is a perspective view of one embodiment of the invention containing a deflecting element in addition to stereoscopic camera system components and a viewer.

FIGS. 1-3 illustrate three embodiments of the invention having a variety of components and applications. FIG. 1 illustrates one embodiment of the Stereoscopic Camera and System and its components, and a viewer. The components are labeled as outlined below:

1. Object in a location being imaged;
2. Optical axes;
3. User interface, in this embodiment a pistol-grip with controls;
4. Stereoscopic Image Acquisition Device (SIAD);
5. Optical instrument, in this embodiment it is a binocular having two telescopes that is attached to the SIAD;
6. Stereoscopic display, in this embodiment an autostereoscopic flat panel;
7. IPU, in this embodiment a display controller is included in the IPU;
8. Viewer, in approximate viewing position in this embodiment to see both object and 3D image; and
9. Image of object in location, appearing in 3D to the viewer.

FIG. 2 shows a close-up of several components of the embodiment shown in FIG. 1 which are labeled as outlined below:

2. Optical axes;
3. User interface, in this embodiment it is a pistol grip with trigger for image capture and thumb-operated joystick for other input functions;
4. Stereoscopic Image Acquisition Device. In this embodiment the connections (not shown) from sensors to acquisition controller are flexible circuits, allowing mutual movement between sensors and acquisition controller;
5. Optical instrument, in this embodiment is a binocular having two telescopes, (5a) and (5b) respectively;
6. Stereoscopic display, in this embodiment for images and user interface;
7. IPU; in this embodiment a display controller is included in the IPU;
10a and 10b. Means to adjust the convergence of the optical axes, in this embodiment it is a flexing beam (10a) with a manually-driven screw (10b);
11a and 11b. Means to adjust the interpupillary distance (IPD), in this embodiment it is a slider traveling on a rail (11a), controlled by an electromechanical actuator (11b);
12. Means to adjust the vertical alignment of the cameras' images, in this embodiment it is an actuator-driven screw; and
13. Battery pack.

Components

In one embodiment, the invention provides a stereoscopic camera system that includes a Stereoscopic Image Acquisition Device 4 (SIAD), a binocular optical instrument 5 that may be attached to or built into the SIAD, and a display mechanisms for displaying stereoscopic images 6 generated by the optical instrument and SIAD. In yet another embodiment, the system may include an image-processing unit 7 (IPU). In another embodiment, the system may include a battery or other power source 13 to provide power to the system. Further embodiments may contain no SIAD but may contain other components to perform similar functions.

The image processing unit 7 as well as the display 6 and a battery 13 (to provide power) may be attached to the device and integrated into a housing, resulting in a complete, integrated, one-piece device that provides all the necessary functionality including: mechanisms for (1) forming a stereoscopic electronic image of an object or location, (2) processing such image data and (3) displaying a magnified, unmagnified, or demagnified stereoscopic image of the object or location, in a desired orientation and condition (e.g. not inverted or reflected, or in any orientation desired by the user), in a convenient position on the stereoscopic display for the viewer, in real time, and in a device which could be portable.

In other embodiments, some or all of the functions of the IPU can be built into circuitry, firmware and software inside the SIAD or elsewhere in the system, such that a separate IPU component may not be required, possibly reducing the size and cost of the system. In yet other embodiments, the one-piece device could be handheld in its use. In further embodiments, the display could be mounted separately with a tethering data cable or wireless link to the SIAD or IPU.

In one embodiment, the display could be mounted to the chest of the user, facing the user's view, such that his hands can be free to steer and operate the device or perform other tasks while observing the image on the display. An additional advantage of such a system is that the user can see the displayed image at the same time as his peripheral vision allows him to see the rest of the location or surroundings, or vice-versa. Additionally, the system could have the display mounted directly on a handheld device that may be the SIAD, to accomplish a similar result. In these or other embodiments the display, or one or more additional displays connected via a "splitter" device, could be mounted such that multiple viewers could see the displayed image.

Image Processing

Image processing could be performed on the data to reduce the perceived effect of camera shake on the viewed stereoscopic image. Time sequential data from both left and right binocular channels in combination could be used to calculate corrections of the data to negate the shake effect of both channels, providing image stabilization for the entire stereoscopic image for example, or to otherwise cause a desired effect. Because the electronic corrections can be calculated knowing the kinematic relationship between the optical axes and because the data from the sensors is synchronized with each other the proper corrections can be applied to the stereoscopic image. This is advantageous as compared to the prior art, which applied the corrections to the views separately and asynchronously, resulting in spurious parallax of the stereoscopic image. Alternatively the corrections could be applied to one or more actuation mechanisms to alter the optical path or paths, such that the image is corrected when it arrives at the sensor.

Data from both left and right channels could be used to calculate corrections to the sensor exposure parameters or corrections to the data itself to optimize the stereoscopic image and to balance the left channel with the right, providing simultaneous exposure or gain control for example. One embodiment of this could involve a simultaneous baseline setting of the two channels to give equal image characteristics, for example performing white balance simultaneously.

Image processing to compress or encode the data could be done to the single data stream or to one or both streams prior to their combination.

Displays

In these and other embodiments of the current invention, the stereoscopic display could be of any type as described in the related U.S. Utility Patent Application Ser. No. 60/762,577 filed on Jan. 29, 2007 that can be further applicable to this invention. In embodiments where the user looks slightly downward to see the display but looks up over the display to see the location being imaged, and where the display is of a type requiring the user to wear spectacles to see the image stereoscopically, it could be advantageous for the spectacles to be constructed like "reading glasses" whereby looking over the active portion of such spectacles the user has an unobstructed view of the location. Alternatively, left-right stick-on films made from polarizers, retarders or other materials required for stereoscopic viewing of the 3D display, for viewers wearing other glasses, or polarized sunglasses, could be used. A graphic on the film could indicate proper orientation. A permanent or non-permanent adhering method could be used.

Another embodiment may have a display that could be switched from displaying either left or right or both views. Another embodiment may have a display that presents either or both views together and has no provision for stereopsis.

Storage

In other embodiments one or more Hard Disk Drives (HDD), Digital Video Disks (DVD), solid-state or other similar data storage devices (SD), could be included in the IPU or elsewhere for storage, further processing and playback of images. Because the SIAD inputs, processes and displays images in generally real-time (as observed by a user), the SD interface circuitry could be constructed such that images can be stored essentially instantaneously, with no perceived latency after a start trigger has been activated. This has previously been a problem with digital cameras, whereby a shutter button is pressed but the image is not taken until after a noticeable delay. In some embodiments, the file structure' may be split into parallel channels such that the bandwidth of data is split to allow that flowing to each SD to be within the SD's transfer rate. In other embodiments, the storage system could make the actual recording of the images on the SD with a delay from when they are captured in system volatile memory. In yet other embodiments, streaming full-motion stereoscopic image data continuously through the SD system, such that there exists some quantity of image data previously stored, upon the occurrence of an event desirable to be viewed but unanticipated, would allow a viewer to review such previously-stored stereoscopic images to view the event after its occurrence. Stereoscopic image data could be updated continuously or in some other manner to, for example, provide a time-lapse stereoscopic recording of an event that occurs slowly. In embodiments where the stereoscopic image data is a single stream, additional synchronization may be unnecessary, resulting in a simpler system, both in storing images and playing them back. Such a system generally has the same data integrity for both the left and right views of images, as opposed to dual-data-channel systems in which either channel may have defects that could spoil the stereoscopic image. Additionally, such a system could also be made redundant and fail-safe, and this could be done more easily to avoid any image data degradation. Such a system could use SDs that generally have low or no recurring costs associated with re-saving newer image data over old. The SD, or its storage media, could be removable, replaceable or expandable, with power on or off. The SD could be of low power such that it could be included in a battery-operated embodiment. The SD could be of low size and weight such that it could be included in a handheld embodiment. The SD could be of sufficient robustness such that it could be included in an embodiment intended for severe-environments.

Lenses

Lenses or other optical components of the camera and their mounting could be such that interchangeable lenses could be used. Such lenses could be capable of focusing light of infrared, UV or visible wavelengths or combinations thereof. The camera could use two lenses, one for each L/R channel, or a single lens with an optical path switching device such as a shuttering system and beamsplitter or a combination of these. For underwater or similar applications, a system wherein the lenses could contact the water directly and there is a seal for the electronic portion of the SIAD, could be used. Furthermore, the internal volume of the sealed portion of the SIAD, possibly including the lenses, could be minimized and securely sealed such that no additional outside housing would be required for use underwater, resulting in a small overall size and weight and easier use. Yet further there could be a tether, thus forming a completely, possibly permanently sealed camera head with a cable, optical fiber or wireless link to the IPU or Display. Such sealing could be potting compound.

The lenses could also be parabolic mirrors to focus directly on the image sensors such as, for example, lenses useful for an IR imaging device with no IR glass optics. Alternatively, lenses could be focused automatically and/or together as described in the referenced patent application. In addition, the lenses could be small to be mounted closely together to make a small inter-pupillary distance.

Convergence

In embodiments having two optical axes, these axes may be parallel, they may converge at some point distant from the camera or they may be adjustable to converge at any point from a close distance to infinity or to diverge. To allow relative motion of the sensors in embodiments where one or more of the sensors can be moved to move the optical axes, the sensors could be connected to the acquisition controller with flexible circuitry, which may be shielded, to allow relative motion while maintaining bandwidth and suppressing noise.

Convergence could be adjusted by use of a mechanism with an actuator to deflect either or both of the sensors' mounting and their respective lens and axis. Alternatively the mechanism could move an optical element, for example a wedge lens, to deflect one or both axes. The mechanism could be comprised of a hinge or a flexing beam of metal, plastic or other suitable material. The actuator could be a manual screw or motorized leadscrew or cam system, or other mechanical or electromechanical device. The control of the actuator could be designed to be operated by the camera user while shooting. The control could be a knob or switch that could also be a handle for one hand. The control could also be a pistol grip device where the user squeezes or activates a lever or wheel to control convergence adjustment. Adjustable stops or detents in the mechanism could be incorporated to aid the user to achieve their desired convergence effect. Convergence could be automated to the autofocus or other aspects of the camera. The IPU, for example, could be programmed to recognize some moving feature and follow it with convergence. There could be a second flexure or mechanism to adjust the axes to 6e coplanar, known in the art as vertical alignment.

Embodiments of the camera or camera systems may also contain a convergence mechanism such that the user can change the convergence as the location is being observed and/or recorded. In such embodiments the convergence mechanism can be constructed such that it causes a continuous change in convergence, a smooth transition that is without abrupt changes in the views.

The convergence device and system described herein could also be used with two separate cameras and camera systems, for example, without the use of the SIAD.

Inter-Pupillary Distance (IPD)

In some embodiments having two optical axes, it may be desirable to change the distance between the axes as measured at the camera, known in the art as the IPD. This could be done by use of a mechanism such as a beam that moves one sensor and its respective lens and housing away from the other sensor, generally perpendicular to the optical axes, that movement taking place in the plane of the axes. A clamp could be used to manually secure the sensor housing along a beam in the desired location to achieve the desired IPD. Such a beam could also be used to adjust convergence by flexing or deflecting. Alternatively the IPD could be adjusted by use of a mechanism with an actuator to move either or both of the sensors and their respective lens and axis. Such an embodiment could be designed to accommodate interchangeable lenses including without limitation wide angle or telephoto lenses for either or both optical channels.

Zoom

Zoom is known in the art as changing the magnification of an optical channel while a location is being observed. Zooming "in" is generally increasing the magnification and zooming "out" is generally decreasing the magnification. Zooming can be performed manually through the use of a mechanism or automatically by sending an electronic signal to an electromechanical actuator. Either technique causes, for example, changes in the axial spacing between or shape of optical elements. Generally it is desirable to have zooming performed such that abrupt changes in views do not occur.

The mechanism could be geared to drive rotational cam devices that appropriately change the spacing between optical elements, and hence the magnification, in each optical path simultaneously. The mechanism could be mechanical or electromechanical.

Digital zoom is an electronic method to present a similar effect of increasing magnification to a viewer of an electronic display. It is typically implemented by causing a subset of the pixels within the data representing a view to be expanded in order to represent the entire data set representing the view. In this approach, additional pixels are fabricated from adjacent pixel data and interspersed between the original pixels to form a view having generally the same number of pixels as the original view. Alternatively, digital zoom can be implemented by choosing a subset of the pixel cells illuminated by the channel optics on a sensor, to form the data representing the view from the sensor of the channel.

The invention may also contain electronic mechanisms to cause digital zoom to be applied to two channels simultaneously. Alternatively, zooming could be done on a master-slave basis whereby the master view's (the right view in this embodiment) magnification is set as desired, and the slave view's (the left view in this embodiment) zoom is automatically controlled to match the master. Such control could use the image data to calculate the proper control parameters, for example by measuring the number of pixels between certain features common in each L/R view and attempting to equalize them, and could be a function of the IPU or acquisition controller.

The zoom device and system described herein could also be used independently with two separate cameras and camera systems, for example, without the use of the SIAD.

Controls

In some embodiments the controls and functions could enable the device to be operated by a single person, remotely or automatically. Control of one or more of the system's functions could be achieved through one or more separate user interface devices used in combination, including without limitation, pushbuttons or other switching devices, a touchpad screen (,separate or attached or a part of the 3D display), a joystick, pistol-grip control device, wheel, lever, mouse or similar device controlling the system that provides user feedback on the 3D display screen or on another screen or output indication device. Such user interface and feedback could be stereoscopic to enhance effectiveness. Such controls could operate remotely from the device via a wireless link or over an interface.

Communication

Communication, including transmittal of image data, and additional control of a system of these embodiments could be performed thru an external interface, including without limitation a network, USB, "firewire", cameralink or custom designed interface or port, to other devices or to a network.

Measurements

Capture of the stereoscopic image data could include the capability to make measurements in three dimensions, x-y-z, z being into/out of the image plane, using the parallax data between left/right views of any point common to both views, to calculate the z dimension. Furthermore, it may be desirable to calculate the location of points with respect to a coordinate system. An embodiment could include a component for determining the location of the stereoscopic camera with respect to the desired coordinate system, for example a GPS receiver, whereby the coordinate system is earth's latitude, longitude and altitude. In addition the embodiment could include a component for determining the direction of the z dimension with respect to the coordinate system, for example an electronic compass and/or an azimuth indicator. The location of points in the stereoscopic image can then be calculated with respect to the coordinate system. Quantization error of such a system could be reduced by networking more than one system viewing the desired points from different camera locations and averaging their calculated locations of the desired points.

An embodiment could include a pan-tilt-zoom mechanism and such mechanism could be equipped with, for example, position indication devices such that the direction of the z dimension could be changed and the new direction calculated with respect to the desired coordinate system.

Deflecting Element

FIG. 3 illustrates one embodiment of the Stereoscopic Camera and System containing a deflecting element, system components, and a viewer. The components are labeled as outlined below:

1. Object in a location being imaged;
2. Optical axes;
4. Stereoscopic Image Acquisition Device;
5. Optical instrument, in this embodiment is a binocular with two telescopes;
6. Stereoscopic display, in this embodiment an autostereoscopic flat panel.
8. Viewer, in approximate viewing position in this embodiment to see 3D image;
9. Image of object in location, appearing 3D to the viewer;
14. Deflecting element, in this embodiment a flat mirror, mounting not shown; and
15a-15c. Wall (15a) between harsh environment (15b) and non-harsh environment (15c); wall is shown in cutaway.

In this embodiment, a deflecting element 14 can be placed in the optical path 2 between the object being imaged 1 and the input optical component of the optical instrument 5. A system with a deflecting element 14 could be used, as a nonlimiting example, to see around corners or to protect the camera or camera system by exposing only the deflecting element 14 to an environment unsuitable for the camera 15b while keeping most of the system in a safe environment 15c, protected from the unsafe environment 15b by, for example, a suitable type of wall 15a. Electronic mechanisms can be utilized to de-reflect the views or the stereoscopic image such that the viewer 8 observes and image 9 of the location as if it was not reflected by the deflecting element. Alternatively, the deflecting element can be adjusted to provide other desirable orientation.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Furthermore, although the present invention is particularly applicable to binoculars and surveillance cameras, it is also applicable to many other types of optical instruments.

I claim:

1. A stereoscopic camera for providing visual observation of a location, the camera comprising:
    a binocular instrument having at least one optical path, wherein the instrument is capable of acquiring a plurality of optical views corresponding to a left view and a right view of a stereoscopic image of the location; and
    a stereoscopic image acquisition device comprising a plurality of optical sensors in the at least one optical path, wherein the plurality of optical sensors is effective to generate at least one data stream corresponding to at least one image data for each view of the plurality of optical views from the instrument wherein at least one first data stream corresponding to the left view is simultaneously generated with at least one second data stream corresponding to the respective right view, the at least one first and second data streams are combined into a third, single data stream wherein timing among the first and second data streams is known and maintained, and the single data stream is effective to represent the stereoscopic image of the location in real time.

2. The stereoscopic camera of claim 1, further comprising an electronic, mechanical or electromechanical mechanism for adjusting a first size of at least one object in at least one image data corresponding to at least one view of the plurality of optical views, whereby the first size is made equal to a second respective size of the at least one object in at least one second image data corresponding to a second respective view of the plurality of optical views.

3. The stereoscopic camera of claim 1, further comprising an electronic or mechanical or electromechanical mechanism for adjusting a first vertical position of at least one object in at least one image data corresponding to at least one view of the plurality of optical views, whereby the first vertical position is made equal to a second respective vertical position of the at least one object in at least one second image data corresponding to a second respective view of the plurality of optical views, whereby spurious vertical parallax is eliminated.

4. The stereoscopic camera of claim 1, further comprising a housing and at least one power source and at least one device selected from the group consisting of:
   at least one storage device receptive to the single data stream, and at least one display mechanism receptive to display the single data stream,
   wherein the housing provides integration of the camera, the at least one power source, and the at least one device, such that the camera is free-standing.

5. The stereoscopic camera of claim 4, wherein the camera is handheld.

6. The stereoscopic camera of claim 4, comprising a power source, a display mechanism, a storage device, and a housing, wherein the housing provides integration of the camera, the power source, the display mechanism, and the storage mechanism.

7. The stereoscopic camera of claim 3, wherein the mechanism can be operated by a single user while observing the plurality of optical views corresponding to the left view and the right view of the stereoscopic image.

8. The stereoscopic camera of claim 1 wherein the camera comprises at least two respective optical paths having at least two respective optical axes, the camera further comprising an adjustment mechanism for aligning the vergence of the respective optical axes of each of the at least two optical paths to coincide at a point in the location at a desired distance which can be varied,
   wherein the adjustment mechanism is connected to at least one of the at least two optical paths,
   wherein the adjustment mechanism comprises a beam connected to and holding one or more of the first and second respective optical paths, wherein the beam is flexible in the direction that aligns the vergence of the axes and is inflexible in other directions and the vergence can be aligned by flexing of the beam without introducing spurious parallax,
   wherein the controls for the adjustment mechanism can be operated by a single user and wherein adjustment can be made while observing the plurality of optical views corresponding to the left view and the right view of the stereoscopic image.

9. The stereoscopic camera of claim 8, wherein the adjustment mechanism for aligning the vergence is at least one of a trigger, a knob, a wheel, and a button.

10. The stereoscopic camera of claim 1, further comprising a display mechanism capable of receiving the real-time stereoscopic image single data stream and displaying a stereoscopic image of the object to a user.

11. The stereoscopic camera of claim 10, further comprising an image processing unit for manipulating the real-time stereoscopic image single data stream, wherein the display mechanism is capable of receiving the manipulated real-time image single data stream.

12. The stereoscopic camera of claim 11, wherein the image processing unit for manipulating the real-time stereoscopic image data stream is affixed to the camera.

13. A stereoscopic camera system comprising at least one camera according to claim 1.

14. The stereoscopic camera of claim 1, wherein each sensor in the plurality of optical sensors further comprises a plurality of pixels, and image data of the at least one first and second data streams comprises pixel data, wherein
   the image data corresponding to a pixel of the left view is simultaneously generated with the image data corresponding to the respective pixel of the right view and
   the first and second data streams of the respective left and right views are combined into a single data stream wherein timing among the pixel data is known and maintained.

15. The stereoscopic camera of claim 14, wherein the plurality of pixels has a resolution of at least 1280×720 pixels for each view.

16. The stereoscopic camera of claim 1, wherein the single data stream is output to another device.

17. The stereoscopic camera of claim 16, wherein the respective image data corresponding to the first and second data streams comprising the single data stream are output simultaneously.

18. The stereoscopic camera of claim 1, wherein the at least one first and second data streams are combined into the third, single data stream prior to storage of at least one image data corresponding to the left view or the right view of the stereoscopic image.

* * * * *